Patented Jan. 12, 1932

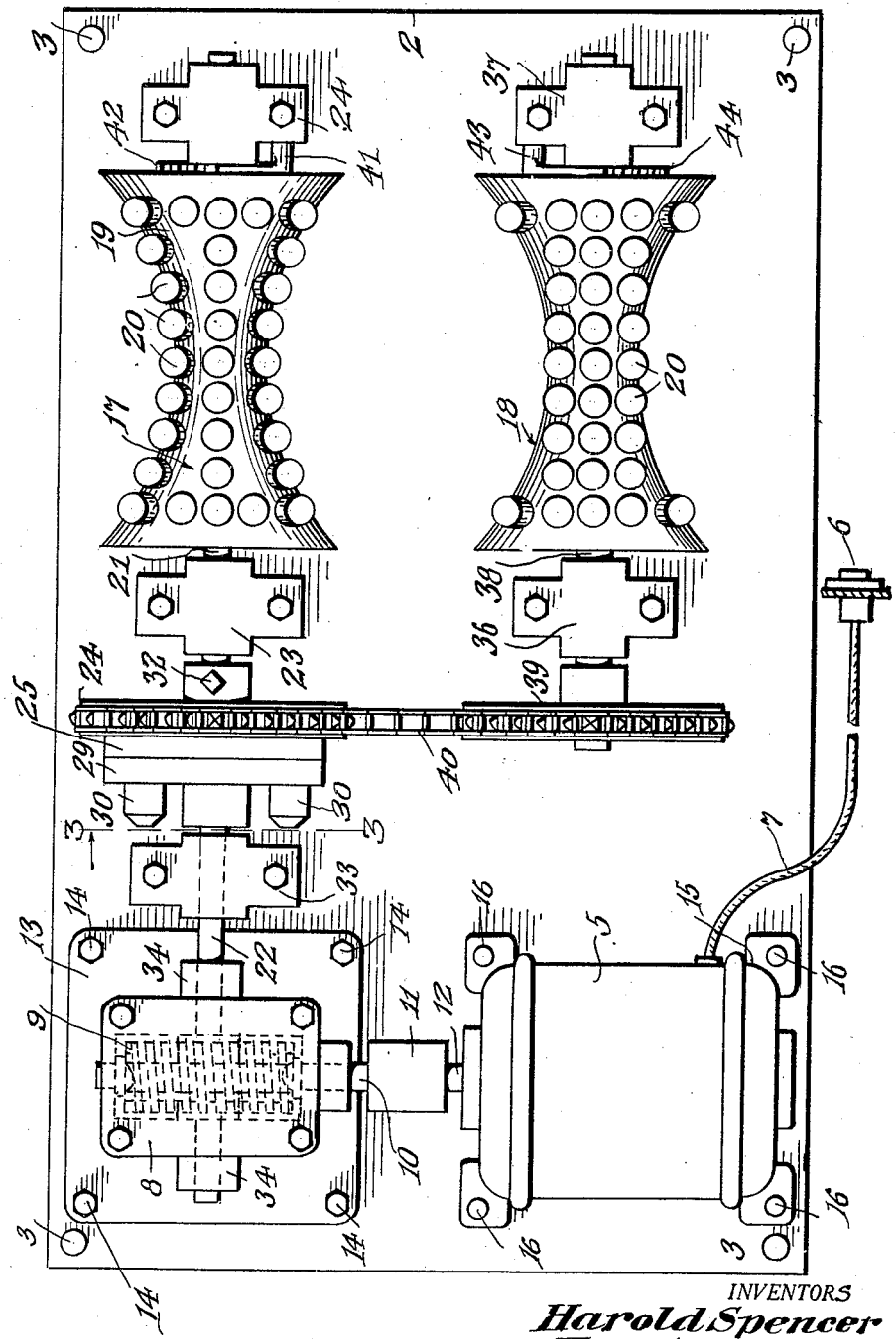

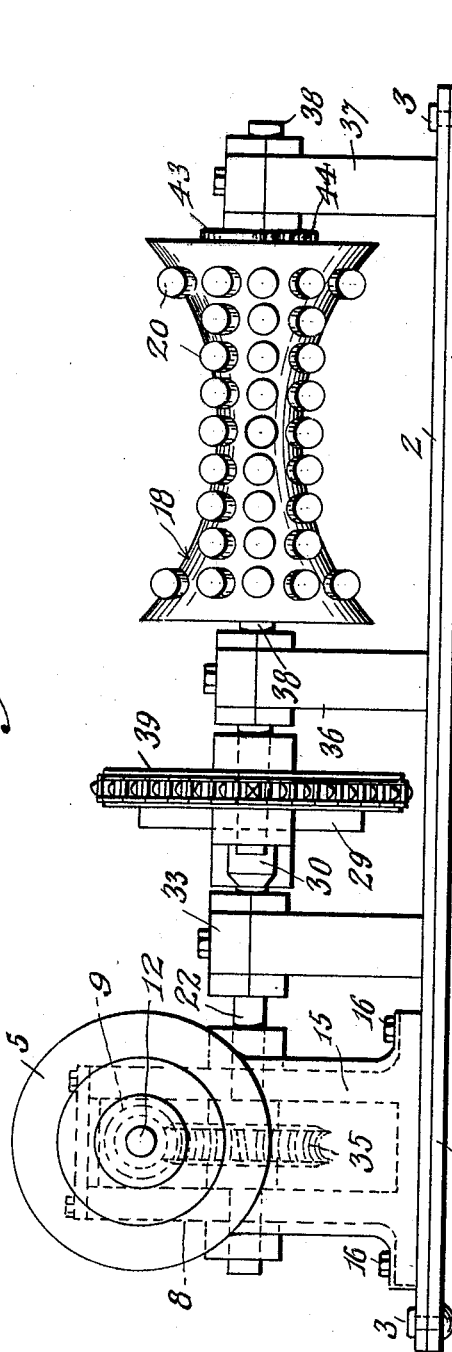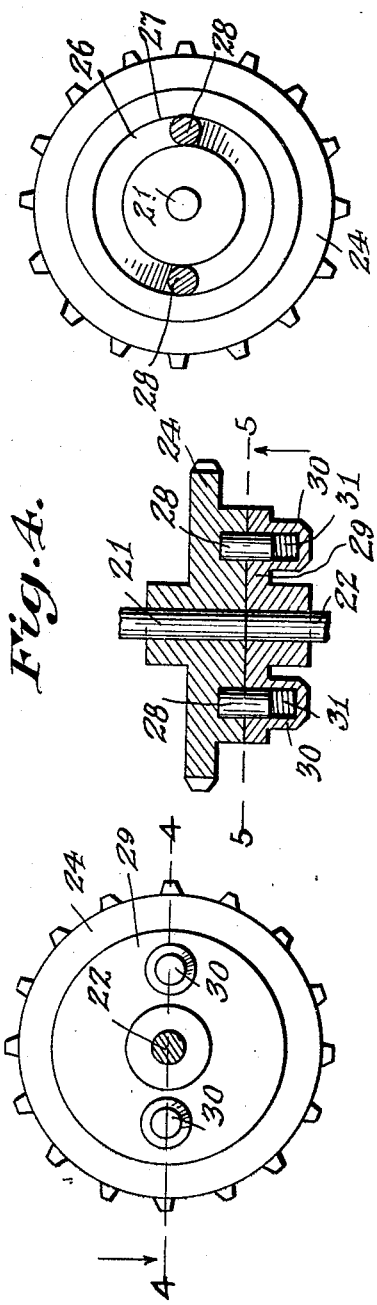

1,841,305

UNITED STATES PATENT OFFICE

HAROLD SPENCER AND FRANK DAVIS, OF DUQUOIN, ILLINOIS

PORTABLE REPAIR MACHINE

Application filed March 26, 1930. Serial No. 439,158.

This invention relates to a portable repair machine designed primarily for use in connection with the repairing of automobiles, but it is to be understood that a machine, in accordance with this invention may be used in any connection for which it is found applicable, and the invention has for its object to provide, in a manner as hereinafter set forth, a repair machine so constructed and arranged as to enable its being used in a thoroughly efficient manner for burning in bearings for automobiles without removing the engine from the block.

A further object of the invention is to provide, in a manner as hereinafter set forth, a portable repair machine for use in connection with automobiles so constructed and arranged as to permit of the operation of the engine of the automobile while in the block of the engine and in the process of being repaired by workmen in the immediate vicinity of the engine.

A further object of the invention is to provide, in a manner as hereinafter set forth, a portable repair machine for automobiles so constructed and arranged as to enable it to be used as a starting device for the automobiles in cold weather.

A further object of the invention is to provide, in a manner as hereinafter set forth, a repair machine so constructed and arranged as to enable or direct the operation thereof by a workman when the latter is under the motor of an automobile.

A further object of the invention is to provide, in a manner as hereinafter set forth, a portable repair machine for the purpose referred to including a driving element whereby the power therefrom may be released after the power applied to the engine of the automobile being repaired comes into action.

A further object of the invention is to provide, in a manner as hereinafter set forth, a portable repair machine including a pair of nigger heads for supporting the wheels of an automobile and means coacting with said heads for fixing them stationary to facilitate the movement of the wheel of the automobile on and off such heads.

A further object of the invention is to provide, in a manner as hereinafter set forth, a repair machine for the purpose referred to so constructed and arranged as to start an automobile by the application of power to only one wheel of the automobile.

A further object of the invention is to provide, in a manner as hereinafter set forth, a machine of the type referred to including a pair of rotatable heads for supporting the wheel of an automobile and with the heads constructed in a manner to aid in the traction of the wheel of the automobile when the heads are rotated.

A further object of the invention is to provide, in a manner as hereinafter set forth, a repair machine for the purpose referred to so constructed and arranged to prevent the automobile from running off the rotatable heads supporting the wheel.

Further objects of the invention are to provide, in a manner as hereinafter set forth, a repair machine which is simple in its construction and arrangement, strong, durable, portable, thoroughly efficient in its use, capable of having its operation controlled from under the motor of an automobile, readily assembled, and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1 is a top plan view of a portable repair machine in accordance with this invention.

Figure 2 is a side elevation thereof.

Figure 3 is a section on line 3—3, Figure 1.

Figure 4 is a section on line 4—4, Figure 3.

Figure 5 is a section on line 5—5, Figure 4.

The machine includes a horizontally disposed mobile base 1 in the form of a rectangular, flat frame having its body of the desired thickness. Mounted upon the top of base 1 is a rectangular platform 2 corresponding in contour to and having its side and end edges flush with the outer edges of the base 1. The platform 2, at each corner thereof, is secured to the base 1, by the rivets 3. The rivets have rounded heads 4, similar to the heads of carriage bolts. The heads 4 depend from the base 1 and function substantially as rollers so that the machine may be shifted about on the floor of a garage or repair shop.

Secured upon the platform 2, in proximity to one end thereof and also to one side of the longitudinal median of said platform 2 is an electric motor 5 having a controlling cord 7 leading therefrom. The cord 7 includes a circuit closing and opening member 6 of the push-button type. The cord 7 is of a length to extend under the automobile being prepared so that it can be handled by the workman or operator for the purpose of throwing the motor 5 into operation when occasion requires.

Secured upon the platform 2 at one end thereof and arranged to oppose the motor 5 in parallel spaced relation, is a housing 8 for a worm 9 which is carried by shaft 10, the latter being coupled as at 11 with the motor shaft 12. The shaft 10 projects from the housing 8 and is suitably journaled therein. The housing 8 includes a base 13, through which extend holdfast devices 14 for fixedly securing it to the platform 2. The motor 5 is carried by a standard 15, fixedly secured with the platform 2 by the holdfast devices 16.

Arranged between the transverse median and other end of the platform 2 and also at each side of the longitudinal median of the latter is a rotatable wheel driving spool or drum substantially in the form of and termed a nigger head. The heads are indicated generally at 17, 18. The heads are arranged in parallel spaced relation. Each head includes a body 19 of circular cross section and which gradually increases in diameter from its transverse center toward each end whereby the body 19 in longitudinal section will be concavo-convex. The periphery of the body 19 is constructed in a manner to provide a roughened surface upon which the weight of the automobile is applied, under such conditions creating a traction surface for the latter. As illustrated, the periphery of the body 19 has projecting therefrom a series of closely arranged circular protuberances 20. It is to be understood however that the periphery of the body 19 can be formed in a manner other than shown to create a traction surface and that the circular protuberances 20 are illustrated as one means for the purpose intended.

The machine further includes a drive shaft for a head 19 and such shaft is formed of two endwise aligning sections 21, 22. Fixed to the section 21, intermediate the ends thereof, is the head 17. Supported bearings 23, 24 are provided for the section 21. The bearing 23 is arranged adjacent the inner end of the shaft section 21.

Fixed to the inner end of the shaft section 21 is a sprocket wheel 24, having one side formed with a circular offset 25 provided with an annular groove 26 having its bottom tapered. The bottom of the groove 26 is indicated at 27. Operating in the groove 26 is a pair of spring controlled pins 28 carried by a disk 29 which is fixed to shaft section 22. The disk 29 is provided with a pair of socket forming members 30, carrying the controlling springs 31 for the pins 28. The sprocket pinion 24 is fixed to the shaft section 21, as at 32. The shaft section 22 extends through a supported bearing 33 and also through the housing 8. The shaft section 22 carries a pair of stop collars 34 which abut against opposite sides of the housing 8 and also carries a worm gear 35 which is positioned in housing 8 and is engaged and operated by a worm 9.

Aligning with the supported bearings 23, 24 respectively, as well as being spaced therefrom, are supported bearings 36, 37 in which is rotatably mounted a shaft 38 for the head 18. The head 17 is fixed to the shaft member 21 and the head 18 to the shaft 38. The head 18 is simultaneously rotated with respect to the head 17 and is driven from the sprocket wheel 24. Fixed to the inner end of shaft 38 is a sprocket pinion 39 which is driven from sprocket pinion 24 by an endless link chain 40.

The elements 26, 27, 28, 29, 30 and 31 constitute a friction clutch to provide for the operation of the head 17 from the motor 5, when shaft 10 is operated. The arrangement also provides for the non-driving of the shaft section 22 when the heads 17 and 18 are driven from the wheel of the automobile.

To prevent the rotation of heads 17 and 18 when the automobile wheel is being mounted therein from one direction, a pawl and a ratchet device, indicated at 41, 42 respectively, are carried respectively by the bearing 24 and one end of head 17 and which coact to lock head 17 and prevent the operation of head 18. When the automobile wheel is mounted from the opposite direction on the heads 18, 17, and a ratchet device 43, 44 connected respectively to the bearing 37 and head 18 and which coact to lock head 18 and prevent the rotation of head 17. It is to be understood that but one of the pawl and ratchet devices may be employed if desired, but if so, it would be necessary to always mount the automobile wheel on the heads from but one side of the machine, but with the employment of the two stop devices the automobile wheel can be mounted and removed from either side of the machine without rotating the heads 17, 18.

It is to be understood that the pawl and ratchet devices shown are illustrated merely by way of example, as any suitable means can be employed in connection with the heads 17, 18 to prevent the rotation thereof when the automobile wheel is being mounted upon or removed from the nigger heads.

The height of the machine is such as to position the nigger heads sufficiently close to the floor that an automobile wheel may be easily backed or run upon the machine while the latter is sitting on the floor. The nigger heads will also be of the necessary diameter to enable the automobile wheel to be easily backed on or run off the nigger heads when desired.

When the automobile is backed on the pair of nigger heads, the latter can be simultaneously rotated for the purpose of revolving the automobile wheel to start the engine of the latter. The operation of the nigger heads is had when the motor 5 is operated, and which can be operated at the will of the workman or operator and also when the workman or operator is under the motor of the engine. In fact, when the workman or operator is positioned under the motor of the automobile the cord or flexible extension 7 enables him to provide for the operation of the motor 5 when desired. The protuberances 20 enable a quick traction to be applied to the automobile wheel to cause the operation of the latter.

After the automobile is driven to the extent to start the engine of the automobile, the motor 5 is cut out, but the heads 17, 18 can be driven from the automobile wheel without operating shaft section 22, due to the frictional clutch arrangement between shaft sections 21, 22.

The portable repair machine, in accordance with this invention provides for the developing power to apply to a single wheel of an automobile. The power is delivered from a worm gearing operated from a small motor, the gearing being graduated to develop the speed with low power.

It is thought that the many advantages of a portable repair machine, in accordance with this invention, as the machine can be shifted from point to point if desired, can be readily understood, and although the preferred embodiment of the invention is as illustrated and described, yet it is to be understood that changes in the details of construction can be had which fall within the scope of the invention as claimed.

What we claim is:

In a repair machine for automotive vehicles, a portable support, a pair of rotatable, spaced parallel nigger heads carried by the support for supporting and imparting traction to a wheel of the vehicle to operate the engine of the latter and each gradually increasing in diameter from its transverse center towards each end thereof, each of said heads having its periphery throughout provided with raised, spaced flattened portions directly engaged by and creating traction for the vehicle wheel, means adjacent one end of each of said heads for simultaneously rotating the latter, said driving means including a resilient releasing means for automatically discontinuing the drive of the heads from the driving means on the operation of the engine of the vehicle, and a controlling means extended from and carried by said driving means for controlling the latter from a point removed from the support.

In testimony whereof, we affix our signature hereto.

FRANK DAVIS.
HAROLD SPENCER.